United States Patent [19]
Thomas

[11] 3,735,522
[45] May 29, 1973

[54] FISHING LURE
[76] Inventor: Richard R. Thomas, 407 Ninth Avenue, Menlo Park, Calif. 94025
[22] Filed: Aug. 24, 1970
[21] Appl. No.: 66,452

[52] U.S. Cl. ............... 43/42.28, 43/42.29, 43/42.51
[51] Int. Cl. .............................................. A01k 85/00
[58] Field of Search .................... 43/42.28, 42.29, 43/42.51

[56] References Cited
UNITED STATES PATENTS

| | | | |
|---|---|---|---|
| 2,833,079 | 5/1958 | Flaska | 43/42.51 X |
| 1,769,083 | 7/1930 | Tozier | 43/42.51 |
| 2,238,292 | 4/1941 | Schavey | 43/42.28 X |
| 539,149 | 5/1895 | Shattuck | 43/42.1 |
| 1,871,971 | 8/1932 | Eppich | 43/42.28 X |
| 2,111,020 | 3/1938 | Arbogast | 43/42.28 |
| 2,168,894 | 8/1939 | Arbogast | 43/42.28 X |
| 2,653,408 | 9/1953 | Bradley | 43/42.28 UX |
| 2,653,409 | 9/1953 | Hancock | 43/42.51 |
| 962,237 | 6/1910 | Murry | 43/42.51 |
| 1,224,074 | 4/1917 | Couper | 43/42.51 |
| 3,397,478 | 8/1968 | Lowes, Jr. | 43/42.28 X |

FOREIGN PATENTS OR APPLICATIONS

| | | | |
|---|---|---|---|
| 68,130 | 7/1944 | Norway | 43/42.51 |

Primary Examiner—Joseph S. Reich
Attorney—Julian Caplan

[57] ABSTRACT

An attachment for a gang hook has a resilient ring with a plurality of integral, depending, thin, flexible legs. The ring is stretched to slip over the hooks and loosely encircle the shank of the hook. The legs extend beyond the barbs and function to insure that the hook trails from the lure body during casting and retrieval. A fish lure body is formed from a metal sheet blank having outward-rearward diverging side edges. The rear corners are oppositely bent at about 90° to provide propellor blades. The hook-connecting ring is attached between the rear corners. The swivel for the leader is attached along one side edge at a point rearward of the front end and is thus eccentric to the longitudinal central axis. An erratic spinning action results during retrieval.

9 Claims, 7 Drawing Figures

PATENTED MAY 29 1973 3,735,522

INVENTOR.
RICHARD R. THOMAS
BY
Julian Caplan
ATTORNEY

FISHING LURE

This invention relates to a new and improved fishing lure. In a preferred embodiment of the invention, the body is provided with an attachment which stretches to fit over the gang hooks attached to the rear of the body, but the body may be used without the attachment and the attachment may be used with other lures preferably of the type having gang hooks.

A principal feature of the present invention is the provision of a body formed of a flat piece of metal bent at the rear to provide two propellor-like blades which tend to cause the body to spin about its longitudinal central axis. The leader is attached to the lure body near the front at a point which is spaced rearward from the front end and is offset relative to said longitudinal central axis.

Thus a principal feature of the invention is the fact that the lure has an action which is attractive to fish. Such action is an erratic spinning action and there is, further, an action which provides the optical illusion of an oscillating pivoting action.

One principal feature of the invention is the offsetting of the hole to which the swivel is attached to provide a distinctive, erratic action. It will be understood that the lure is symmetric relative to said axis in all respects other than the point at which the swivel is attached. The propellor-like blade imparts a tendency to spin, but the offsetting of the swivel causes the spin to be erratic rather than regular.

Another feature of the invention is the fact that the body is made of a single piece of metal which is bent to form the propellor blades.

To impart greater reflectance to the lure, the body is preferably highly polished and the central portion thereof may be peened. Further for reflectance, the back end of the body may be bent at a slight angle such as about 30° to form on either side of the lure a facet. The facet merges with the propellor blade on either side of the lure.

A still further feature of the invention is the provision of a worm or a worm-like attachment which is formed of a resilient material. Such attachment has a ring which stretches to fit over the gang hook and to loosely encircle the shank thereof. Extending rearward from the ring is a plurality of legs which trail rearwardly relative to the hook.

Another function of the attachment is the fact that it causes the hook to trail both during casting and retrieval.

An important feature of the invention is the fact that the attachment is rapidly and easily removed or attached to any gang hook. Since there is no permanent connection and the ring of the attachment is merely stretched over the hooks there is no need to disassemble the lure to effect the connection and disconnection. Further, the user may remove the attachment while fishing since no tools are required.

Other objects of the present invention will become apparent upon reading the following specification and referring to the accompanying drawings in which similar characters of reference represent corresponding parts in each of the several views.

Figure 1:
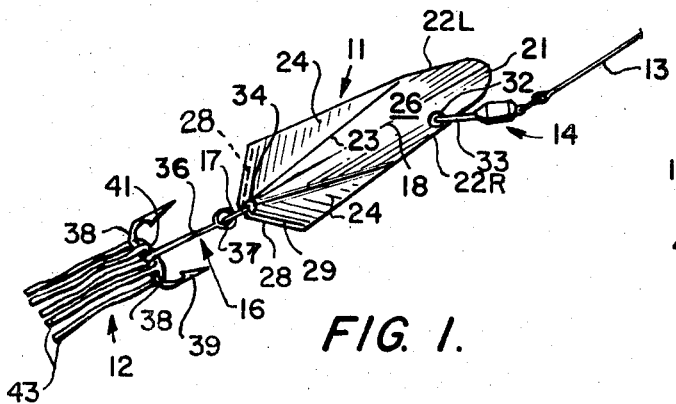
FIG. 1 is a plan of the lure.

The lure of the present invention comprises an integral lure body 11 of relatively thin metal and plated or otherwise provided with a shiny surface which reflects light and makes the lure more visible to fish. Attachment 12 trails the body 11 and is a separate member preferably formed from a plastisol, which, when set, is both flexible and resilient. Leader 13 is attached by means of a swivel 14 at a point on body 11 which is offset relative to the central longitudinal axis 18 of said body while the ring 17 which attaches body 11 to the hook 16 is located at the rear end of said axis 18.

Body 11 is fabricated from a piece of sheet metal of the character described. Prior to the bending operation which gives it the shape which is described in detail, the blank for the body 11 is generally triangular. The apex which forms the nose 21 of the lure is rounded in about a 90° arc. Rearward of nose 21 the side edges 22L and 22R diverge outwardly-rearwardly at an angle about 30° relative to each other. In a preferred embodiment of the invention, about one-quarter distance rearward of the front nose 21 breaks 23 defining fold lines 23 are placed in the body. Said lines 23 are at an angle of about 150° relative to edges 22L or 22R and define facets 24 which are bent in opposite directions each at an angle of about 30° relative to the main body portion 26. The facets 24 function primarily to impart additional reflectance to the lure body, but they also aid the spinning action of the lure. To further enhance the reflectance, the main body portion 26 forward of facets 24 may be peened.

The opposite corners may be bent relative to the adjacent facets 24 to form blades 28, each blade being approximately an equilateral triangle, the length of each side being approximately one-quarter of the total length of body 11. Blades 28 are disposed at an angle of approximately 90° relative to the facets 24 which adjoin. As has previously been stated, the facets 24 are bent oppositely relative to central body portion 26, and each of the blades 28 is bent the same direction as the adjacent facet 24. Blades 28 function as propellor blades and, as the lure is retrieved through the water, the force of the water striking the blades 28 causes the body 11 to spin, normally about its central longitudinal axis 18.

An important feature of the present invention is the fact that the hole 32 to which the rear eye 33 of swivel 14 is attached is offset relative to said axis 18 and is also spaced rearwardly from nose 21 a distance equal to about one-quarter of the total length of the lure. The location of hole 32 may be varied somewhat. However, the further forward the hole is located the tighter the lure spins, and the further rearward the greater the radius of the spin. The offsetting of hole 32 imparts the distinctive, erratic spinning action to the lure; and it will be observed that except for the location of said hole, the lure is symmetric from front to rear about said axis 18. The hook 16 is attached at the rear of the lure by means of ring 17 which passes through a hole 34 which lies on said axis 18.

Hook 16 is subject to variation depending upon the location where the lure is being used and the preference of the user. A common gang hook has a central shank 36 formed at its forward and with an eye 37 through which ring 17 passes. A conventional three-barbed hook may have three curved portions 38 which diverge from the rearward end of shank 36 and are formed at their forward ends with barbs 39. A single barb or two-barbs may be substituted.

Figure 4:
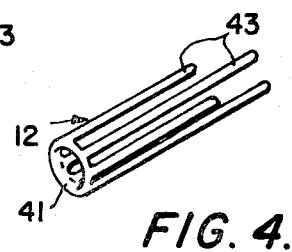
FIG. 4 is a perspective view of the attachment after being shaped.
Figure 2:
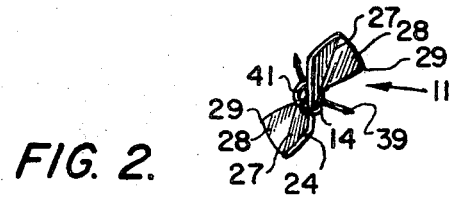
FIG. 2 is a front elevation.
Figure 3:
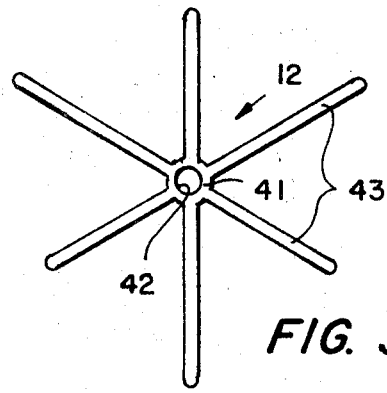
FIG. 3 is an enlarged plan of the attachment prior to being shaped.
Figure 7:
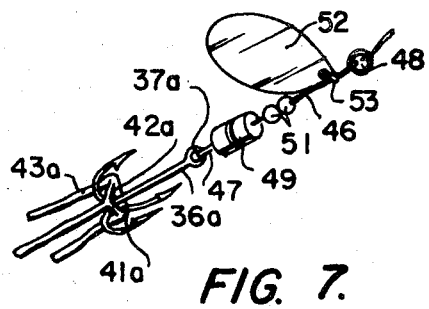
FIG. 7 is a perspective view showing the attachment of FIG. 6 on a conventional spinner.
Figure 5:
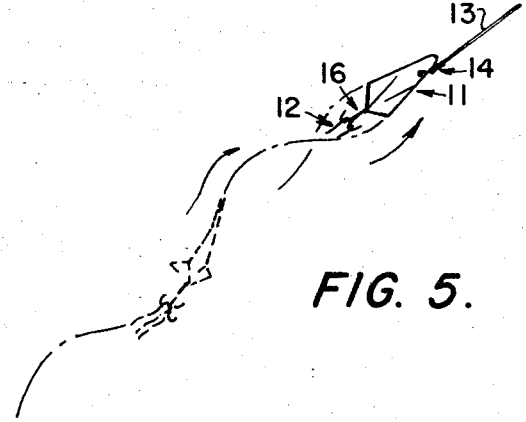
FIG. 5 is a schematic perspective view illustrating the action of the lure.

Attachment 12 is formed of a flexible, preferably resilient and stretchable material. A preferred manner of fabrication thereof is to cast it in a mold from a plastisol in flat condition. Thus, as shown in FIG. 3, there is a ring 41 having a central hole 42 and diverging from ring 41 in spider fashion are legs 43 of extended length. Ring 41 is planar and aperture 42 is of a diameter greater than that of shank 36 so that the attachment may be installed as shown in FIGS. 1 and 7 so that the downstream face of ring 41 engages the curved portions 38 of hook 16 with the plane of the ring perpendicular to shank 36. Legs 43 extend between and beyond the hook portions and are parallel to shank 36 as the lure is drawn through a body of water. As shown in FIG. 3, there are six legs 43 but this number is subject to variation. The plastisol is heated at 325° F. for about 10 minutes to set. After it has set and been stripped from the mold, the blank from which the attachment 12 is formed is reheated, the ring 41 being elevated above the bottom of the oven for about 1 minute. This causes the legs 43 to droop to the shape shown in FIG. 4 wherein the legs 43 extend rearward relative to the ring 41 perpendicular to the plane of the ring.

To install attachment 12, the ring 41 is stretched to fit over the barbs 39 of hook 16 so that the ring 41 may loosely encircle shank 36. Preferably the number of legs is divided equally between the barbs 39 of hook 16.

Body 11 spins relative to axis 18, but because the attachment of swivel 14 is at hole 32 eccentric to said axis, the spinning is erratic and is particularly attractive to fish. As the lure is retrieved by drawing leader 13 toward the rod, water impinges upon the blades 28 and this causes the lure to spin. It will be understood that in ordinary lures formed of metal the lure action is a wobbly one which is characteristic of a spoon, but the present invention has a more pronounced spin than is common among lures formed from flat metal blanks. In addition to its spinning action, the eccentric location of the hole 32 causes a corkscrew or helix path through the water, and in general there is a rhythmic but erratic action. The attachment 12 dampens the erratic action of the lure to a certain extent, but more importantly, the legs 43 trail from the hook 16. The attachment insures that the hook 16 extends rearward from body 11 both during casting and retrieving. In addition to other advantages, the rearward trailing during casting has a tendency to reduce fouling during casting and snagging of the hooks on underwater obstructions.

Figure 6:
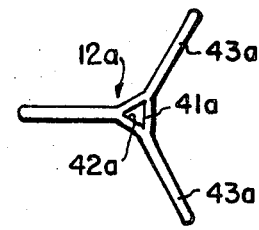
FIG. 6 is a view similar to FIG. 3 of a modified attachment.

FIGS. 6 and 7 show a modification of the attachment and, since many of the portions are similar, the same reference numerals, followed by subscript *a* are used to designate corresponding parts.

In this form of the invention the central hub 41a of attachment 12a is triangular rather than circular and the aperture 42a is likewise triangular. There are three arms 43a radiating from the corners of hub 41a. As shown in FIG. 6, the attachment is molded flat. It is then heated and droops to the shape of FIG. 7, the sides of the hub curving and the arms 43a bending rearwardly.

Instead of lure 11, a conventional spinner may be used built up on a wire 46 having a rear eye 47 engaging eye 37a of hook 16a and front eye 48. Such spinner may have rotatable on wire 46 a cylindrical body 49, beads 51 and a spinner blade 52 connected by connector 53, all of which revolve about wire 46. In this modification, hub 41a is stretched over the hooks to loosely fit over shank 36a. It will be noted that there is one arm 43a for each barb 39a.

What is claimed is:

1. A lure comprising a body formed of a single piece of material having a flat central body at its forward end, said central body having side edges which diverge rearwardly of said forward end, the rear corners of said body extending oppositely at about 90° relative to said central body to form blades which tend to spin said body when retrieved in the water, said body formed with an aperture near one said side edge spaced slightly rearward of said forward end to receive a swivel, a gang hook having a shank and a plurality of outwardly curved portions at one end thereof terminating in barbs, means to connect said hook to said body at the center of its rear end and an attachment for said body, said attachment formed of a flexible, stretchable material and comprising an annular hub having an aperture greater than the cross-section of said shank and encircling said shank, said hub being planar with its downstream face engaging said curved portions with the plane of said hub perpendicular to said shank, and a plurality of arms attached to said hub and extending rearwardly a substantial distance beyond said hook, and extending between said curved portions and parallel to said shank as said lure is drawn through a body of water.

2. A lure according to claim 1 in which each said blade is approximately an equilateral triangle, said blades intersecting at the center of the rear edge of said body.

3. A lure according to claim 2 in which said body is formed with a facet on either side of the longitudinal center line of said body, each said facet extending at an angle of about 30° with respect to said central body along a fold line which extends from a point on one side edge which is about one-quarter of the length of said body rearward of said front edge to a point at the center of said rear end.

4. A lure according to claim 1 in which said arms are substantially equi-distantly spaced around the periphery of said hub.

5. A lure according to claim 4 in which there are two arms for each individual hook of said gang hook.

6. An attachment for a gang hook of the type having a shank and a plurality of outwardly curved portions at one end thereof terminating in barbs comprising a planar hub formed of stretchable, flexible material formed with an aperture greater than the diameter of the shank of a gang hook, and a plurality of integral, thin arms connected to said hub and disposed approximately perpendicular to the plane of said hub, said attachment when installed on a gang hook adapted to be positioned with the downstream face of said hub engaging the curved portions of said hook with the plane of said hub perpendicular to said shank and with said arms extending between and beyond said curved portions parallel to said shank as said hook is drawn through a body of water.

7. An attachment according to claim 6 in which said legs are substantially equi-distantly spaced about the periphery of said hub.

8. An attachment according to claim 6 and a gang hook having a shank and a plurality of curved individual hooks, said hub loosely encircling said shank, said arms extending beyond said hook.

9. An attachment according to claim 6 in which said hub is generally triangular with a central triangular aperture.

* * * * *